US008024633B2

(12) United States Patent
Hafeez et al.

(10) Patent No.: US 8,024,633 B2
(45) Date of Patent: Sep. 20, 2011

(54) METHOD AND APPARATUS FOR COMBINED PACKET RETRANSMISSION AND SOFT DECODING OF COMBINED PACKETS IN A WIRELESS COMMUNICATION NETWORK

(75) Inventors: Abdulrauf Hafeez, Cary, NC (US); Dayong Chen, Cary, NC (US); Dennis Hui, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1033 days.

(21) Appl. No.: 11/746,679

(22) Filed: May 10, 2007

(65) Prior Publication Data

US 2008/0282125 A1    Nov. 13, 2008

(51) Int. Cl.
*G08C 25/02* (2006.01)
(52) U.S. Cl. .................................................. 714/748
(58) Field of Classification Search .................. 714/748
See application file for complete search history.

(56) References Cited

U.S. PATENT DOCUMENTS

| | | | |
|---|---|---|---|
| 7,302,628 B2 * | 11/2007 | Huang et al. | 714/751 |
| 7,362,733 B2 * | 4/2008 | Kim et al. | 370/335 |
| 2003/0072286 A1 * | 4/2003 | Kim et al. | 370/335 |
| 2005/0058154 A1 * | 3/2005 | Lee et al. | 370/473 |
| 2006/0291410 A1 * | 12/2006 | Herrmann | 370/328 |
| 2007/0106924 A1 * | 5/2007 | Seidel et al. | 714/748 |

FOREIGN PATENT DOCUMENTS

| | | |
|---|---|---|
| WO | 00/24153 | 4/2000 |
| WO | WO 0024153 A1 * | 4/2000 |

OTHER PUBLICATIONS

Chase, D. "Code Combining—A Maximum-Likelihood Decoding Approach for Combining an Arbitrary Number of Noisy Packets." IEEE Transactions on Communications, vol. COM-33, No. 5, pp. 385-393, May 1985.
Jolfaei, M. A. et al. "Improved Selective Repeat ARQ Schemes for Data Communications." Proceedings of the IEEE Vehicular Technology Conference, pp. 1407-1411, 1994.
Larsson, P. et al. "Coded Bi-directional Relaying." 63rd IEEE Vehicular Technology Conference, vol. 2, Spring 2006, pp. 851-855.
Fragouli, C. et al. Network Coding: An Instant Primer. Computer Communication Review—CCR, vol. 36, No. 1, pp. 63-68, Jan. 2006.

* cited by examiner

*Primary Examiner* — M. Mujtaba Chaudry
*Assistant Examiner* — Enam Ahmed

(57) ABSTRACT

In a wireless communication network using point-to-point or point-to-multipoint communications, this disclosure teaches the use of combined packets for retransmission and corresponding soft value processing at a receiver, wherein combined packets are formed as the logical combination of two or more previously transmitted packets and allow the receiver to use a single combined packet to correct one or more failed packets. For example, with the combined packet retransmission and corresponding soft value receiver processing as taught herein, a given receiver can use a given combined packet to correct bit errors in all (failed) packets comprising the combined packet as long as the bit errors in a failed packet do not overlap (or align) with bit errors in the other failed packets comprising the combined packet.

40 Claims, 4 Drawing Sheets

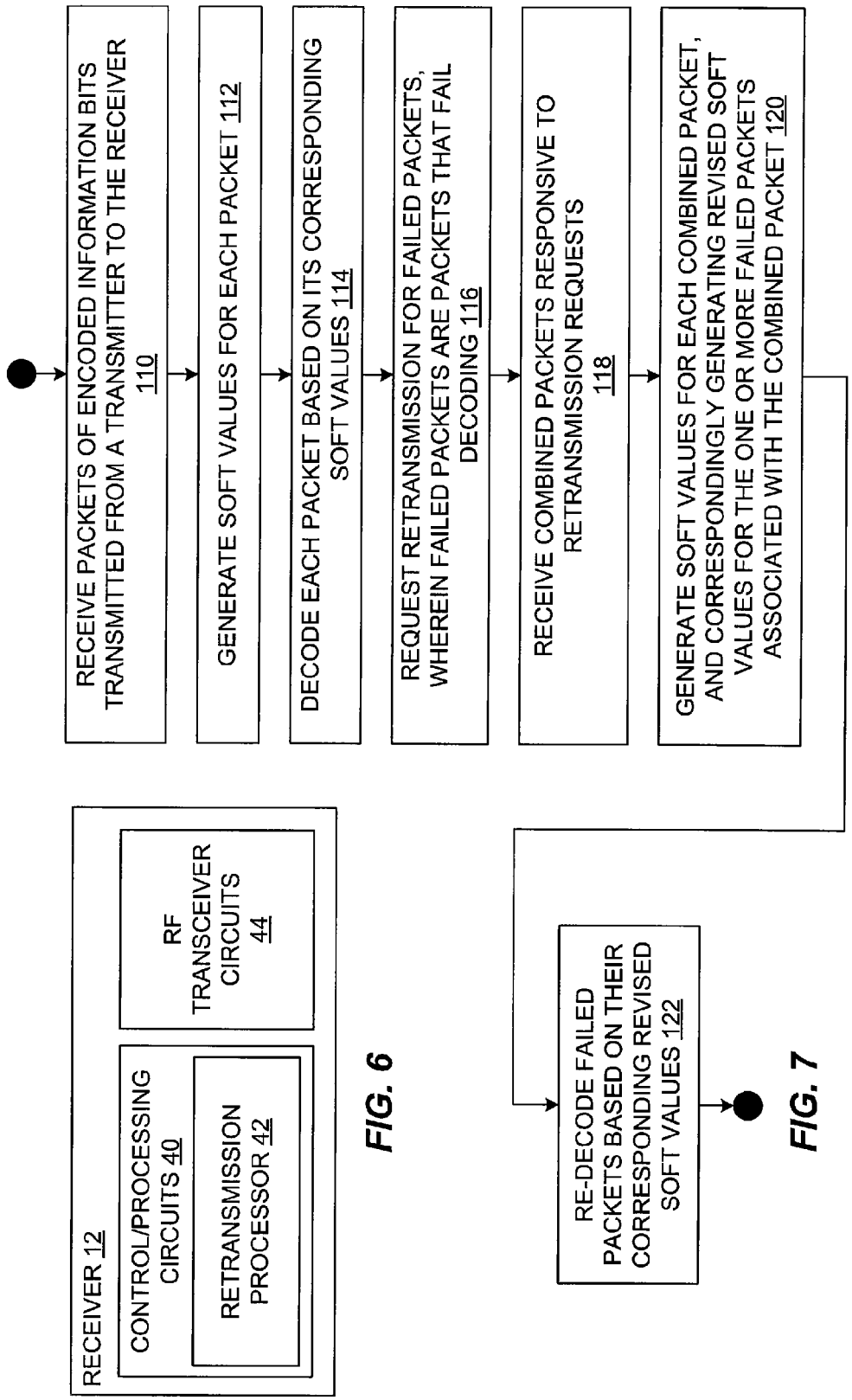

METHOD AND APPARATUS FOR COMBINED PACKET RETRANSMISSION AND SOFT DECODING OF COMBINED PACKETS IN A WIRELESS COMMUNICATION NETWORK

BACKGROUND

1. Technical Field

The present invention generally relates to wireless communication networks, and particularly relates to packet retransmission processing and packet combining in such networks.

2. Background

Noisy communication channels, such as those present in wireless communication networks, inevitably cause communication errors. Channel coding schemes, wherein underlying information bits are interleaved and/or encoded for transmission, offer significant error protection and error detection capabilities, based on corresponding decoding processing at targeted receivers. Even with such schemes, however, decoding errors may arise at the receiver. Numerous retransmission techniques have been devised to deal with decoding failures, wherein receivers request packet retransmissions responsive to detecting packet decoding failures, e.g., detected CRC (cyclic redundancy check) failures.

In particular, one or more HARQ (hybrid automatic repeat request) retransmission schemes are integral to several current and developing wireless communication standards, including HSDPA (High Speed Downlink Packet Access) services and HSUPA (High Speed Uplink Packet Access) services in WCDMA (Wireless Code Division Multiple Access) networks. HARQ retransmission schemes commonly use either CC (Chase Combining) or IR (Incremental Redundancy) techniques for failed packet retransmission.

For example, in response to receiving a retransmission request for a given failed packet, a CC transmitter retransmits the failed packet. Correspondingly, the requesting receiver combines the repeated copy of the failed packet with its original copy, for improved decoding accuracy. In contrast, an IR transmitter retransmits a different set of parity bits related to a failed packet for which a retransmission request was received. The requesting receiver uses both the old and the new parity bits to detect/correct decoding errors in a subsequent decoding attempt for the failed packet. Because CC allows the receiver to combine the repeated packet with the originally received copy of that packet, its memory requirements are generally less than that of IR, where the receiver must retain the old and the new parity bits for re-decoding of the failed packet.

Despite its memory advantages for the receiver, CC-based retransmission schemes do not allow fine granularity with respect to changing the (en)coding rate used for retransmitted packets. For example, assume that a failed packet originally was transmitted using ½ rate encoding. Retransmission of that packet effectively reduces the coding rate for that packet to ¼. That reduction in coding rate represents transmission inefficiency to the extent that a less aggressive coding rate, ⅓, for example, would have sufficed.

Further, CC-based retransmission schemes can be particularly inefficient in select repeat contexts. For example, with selective repeat HARQ, consider the case where two packets A1 and A2 are broadcast to two receivers R1 and R2. It is possible, for example, that receiver R1 receives packet A1 incorrectly and receiver R2 receives packet A2 incorrectly. In that case, the transmitter has to resend the A1 packet so that receiver R1 can correctly decode the A1 packet, and has to resend the A2 packet so that the receiver R2 can correctly decode the A2 packet. Put simply, selective repeat retransmission schemes require a separate retransmission for each packet that is incorrectly received at any receiver within a given group of receivers.

SUMMARY

In a wireless communication network using point-to-point or point-to-multipoint communications, this disclosure teaches the use of combined packets for retransmission and corresponding soft value processing at a receiver, wherein combined packets are formed as the logical combination of two or more previously transmitted packets, and allow the receiver to use a single combined packet to correct one or more failed packets. For example, with the combined packet retransmission and corresponding soft value receiver processing as taught herein, a given receiver can use a given combined packet to correct bit errors in all (failed) packets comprising the combined packet as long as the bit errors in a failed packet do not overlap (or align) with bit errors in the other failed packets comprising the combined packet.

In one or more embodiments, a receiver implements a method of packet decoding utilizing retransmission requests for failed packets. In at least one such embodiment, the method includes receiving packets of encoded information bits transmitted from a transmitter to the receiver, generating soft values for each packet, decoding each packet based on its corresponding soft values, and requesting retransmission for failed packets, wherein failed packets are packets that fail decoding. The method further includes receiving combined packets responsive to retransmission requests, where each combined packet is formed at an associated transmitter as a logical combination of two or more previously transmitted packets, including one or more failed packets. The method further includes generating soft values for each combined packet, and correspondingly generating revised soft values for the one or more failed packets associated with the combined packet by forming weighted combinations of the soft values of the combined packet and the soft values previously generated for the one or more failed packets, and re-decoding failed packets based on their corresponding revised soft values.

The above receiver-based processing may be implemented in a receiver based on including in the receiver one or more appropriately configured processing circuits, which may comprise hardware, software, or any mix thereof. For example, a special or general-purpose microprocessor or digital signal processor may be configured to execute computer program instructions carrying out the above method of combined packet processing, or variations thereof.

Complementing the above receiver-based processing, in one or more embodiments, a method of retransmitting packets of encoded information bits from a transmitter includes receiving a retransmission request for one or more failed packets, forming a combined packet responsive to the retransmission request, wherein the combined packet is a logical combination of two or more previously transmitted packets, including the one or more failed packets, and transmitting the combined packet to the associated receiver. As with the above receiver examples, the combined packet transmission method may be implemented by including in a transmitter one or more appropriately configured processing circuits, which may comprise hardware, software, or any mix thereof.

By way of non-limiting examples, the teachings set forth herein, and variations of those teachings, may be applied to WCDMA (Wideband Code Division Multiple Access) networks offering HSDPA (High Speed Downlink Packet Access) services and/or HSUPA (High Speed Uplink Packet Access) services. As a non-limiting detail, such networks may use Type II HARQ (Hybrid Automatic Repeat request).

Of course, the present invention is not limited the above contexts, nor is it limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 6 is a block diagram of one embodiment of a receiver configured to support combined packet retransmission.

FIG. 7 is a logic flow diagram illustrating one embodiment of processing logic for supporting combined packet retransmission at a receiver.

DETAILED DESCRIPTION

Figure 1:
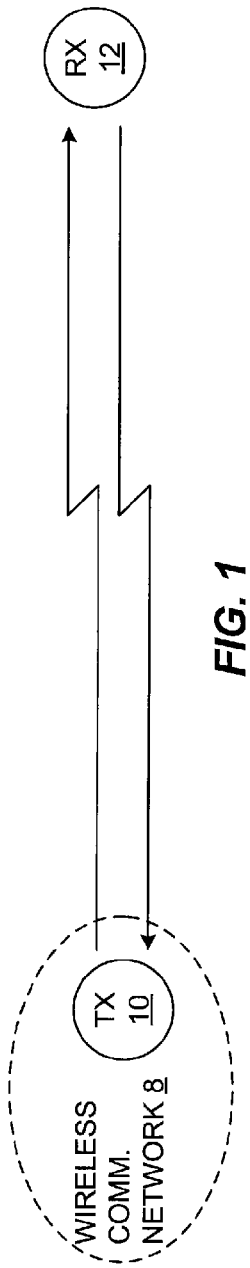
FIG. 1 is a block diagram partially illustrating a wireless communication network that includes an embodiment of a transmitter configured for combined packet retransmission as taught herein, and further illustrates an embodiment of a receiver that is correspondingly configured to support combined packet retransmission.

FIG. 1 partially illustrates a wireless communication network 8 that includes a transmitter 10 for transmitting packets of encoded information to a (remote) receiver 12, wherein the receiver 12 is configured to send retransmission requests responsive to detecting packet decoding failures, and wherein the transmitter 10 is configured to send combined packets responsive to such retransmission requests. According to one or more embodiments taught herein, each combined packet comprises a logical combination of two or more previously transmitted packets. Use of such packets in combination with soft value processing at the receiver 12 provides, among other things, improved error correction processing at the receiver 12, as compared to CC-based retransmission protocols, or IR-based retransmission protocols.

By way of non-limiting example, the wireless communication network 8 comprises a WCMDA-based network offering HSDPA and/or HSUPA services. In such embodiments, the transmitter 10 comprises a Node B radio transceiver and/or a supporting RNC (Radio Network Controller) and the receiver 10 comprises a wireless communication device, such as a cellular radiotelephone, PDA (Portable Digital Assistant), pager, wireless communication card or module, etc. Thus, it should be understood that the wireless communication network 8 appears in simplified form, and that the transmitter 10 and the receiver 12 each may operate as transmit/receive devices or systems, i.e., the terms "transmitter" and "receiver" here provide convenient reference terminology in the context of packet transmission, reception, and retransmission operations.

Figure 2:
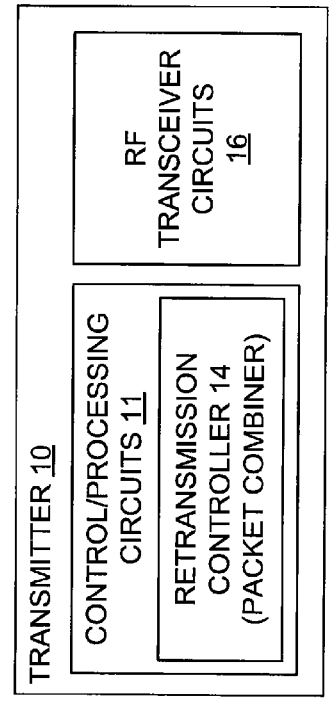
FIG. 2 is a block diagram of one embodiment of the transmitter shown in FIG. 1.

In a more detailed depiction, FIG. 2 illustrates one embodiment for the transmitter 10, wherein it functionally comprises control/processing circuits 11, including a retransmission controller 14, and RF (radiofrequency) transceiver circuits 16. Those skilled in the art will appreciate that at least a portion of the control/processing circuits 11, including the retransmission controller 14, may be implemented in hardware, software, or any combination thereof. For example, in at least one embodiment, the control/processing circuits 11 include one or more special or general-purpose microprocessors, digital signal processors, and/or other digital processing elements, which are configured to execute computer program instructions implementing retransmission processing according to any of the embodiments taught herein.

Figure 3:
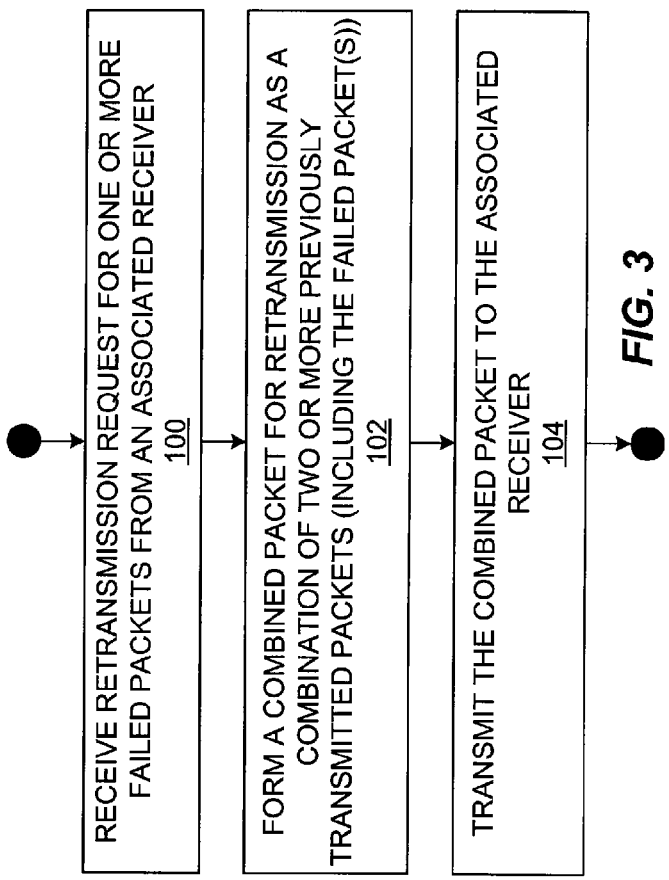
FIG. 3 is a logic flow diagram illustrating processing logic for one embodiment of combined packet retransmission at a transmitter.

FIG. 3 illustrates transmitter processing logic according to one or more such embodiments or retransmission processing. While the illustrated processing is sequential, it should be understood that, where possible, one or more illustrated processing steps may be performed concurrently. Moreover, it should be understood that the illustrated processing may be performed on an on-going basis, and may be included in a larger set of ongoing transmitter processing operations.

In any case, the illustrated processing "begins" with the transmitter 10 receiving a retransmission request the receiver 12, for one or more failed packets (Step 100). The retransmission request may identify the failed packet(s), such as by sequence number or other identifier. Also, it will be appreciated that the retransmission request may be explicit or implicit (e.g., negative acknowledgement or time-out). Processing continues with the transmitter 10 forming a combined packet for retransmission as a logical combination of two or more previously transmitted packets, including the failed packet(s) giving rise to the retransmission (Step 102). Processing further continues with the transmitter 10 transmitting the combined packet to the receiver 12 (Step 104).

With the above processing as one example, it should be understood that, broadly, the transmitter 10 is configured to retransmit packets of encoded information bits to the receiver 12 (and to essentially any number of receivers). Enabling that configuration, the transmitter 10 may comprise one or more processors configured to receive a retransmission request for one or more failed packets, wherein failed packets are those packets that fail decoding at the receiver 12, form a combined packet responsive to the retransmission request, wherein the combined packet is a logical combination of two or more previously transmitted packets, including the one or more failed packets, and transmit the combined packet to the receiver 12.

Figure 4:
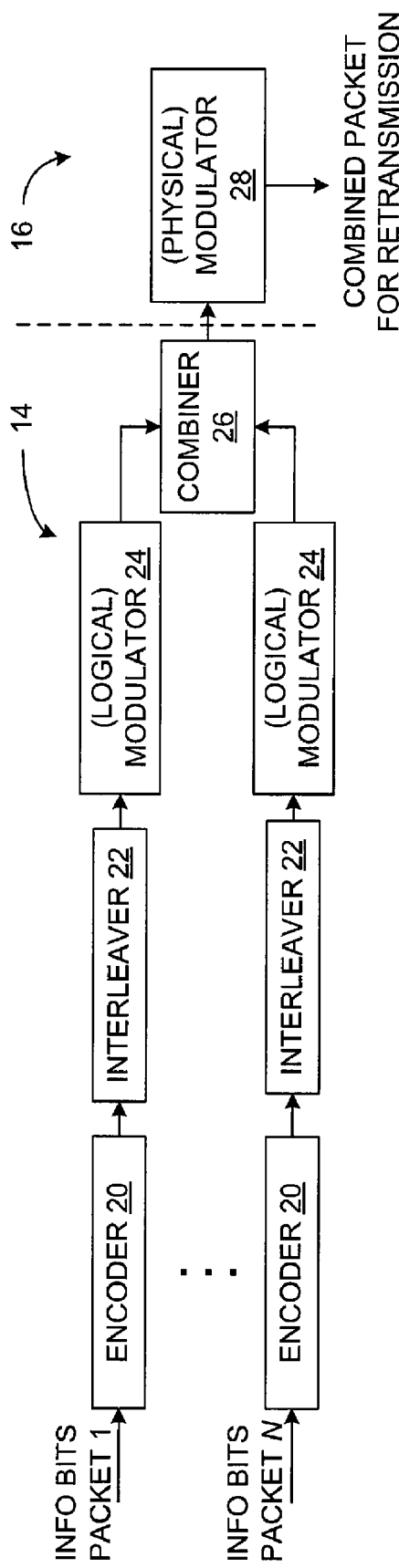
FIG. 4 is a block diagram of one embodiment of functional circuits supporting combined packet retransmission at a transmitter.

In one or more embodiments, the transmitter 10 is configured to form the combined packet by combining the coded bits or coded symbols of the two or more previously transmitted packets, e.g., by linearly combining the coded bits or symbols. For example, FIG. 4 illustrates one embodiment of the retransmission controller 14, wherein it is configured to form combined packets based on combining the logical symbols of two or more encoded packets. As a non-limiting example, combining coded bits or symbols may comprise XOR-ing coded bits or symbols to form coded bits or symbols of the combined packet.

In more detail, the retransmission controller 14 includes or is associated with a number of encoders 20, each receiving the information bits for a given one of the N packets to be combined into a combined packet for retransmission ($N \geq 2$). A like number of interleavers 22 interleave the coded bits respectively output from their corresponding encoders 20, and a like number of "logical" modulators 24 generate logical modulation symbols from the interleaved, coded bits input into each one. In turn, a combiner 26 combines the N logical modulation symbols into a combined logical modulation symbol representative of the coded information bits from the 1 . . . N information packets. The combined logical modulation symbol is then passed to a physical modulator 28, for modulation onto a physical carrier signal, for transmission to the receiver 12.

Figure 5:
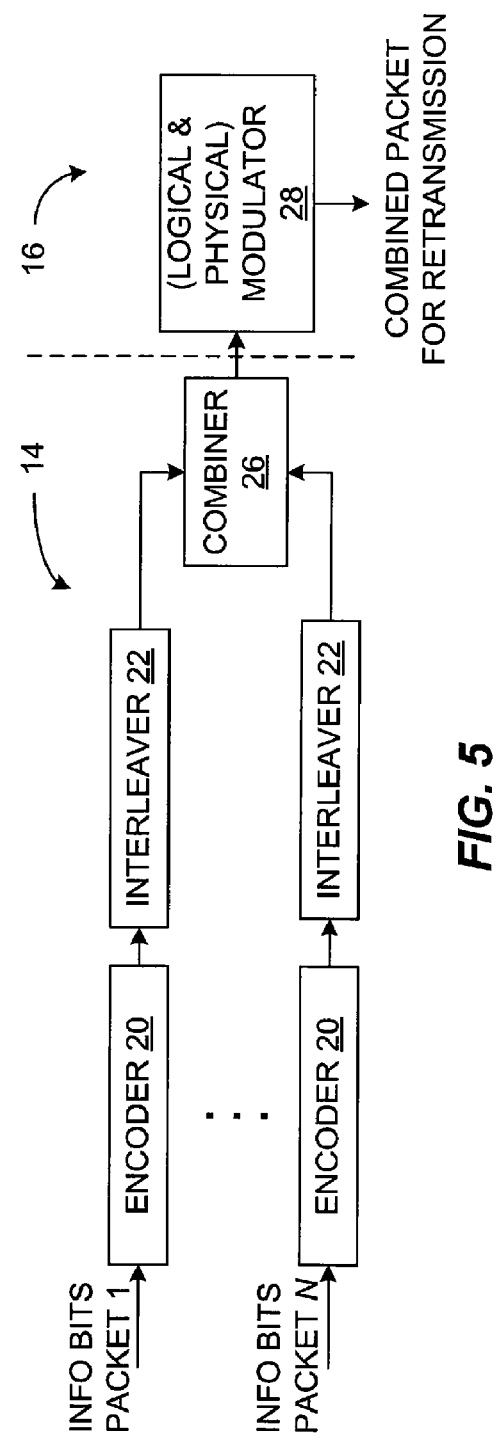
FIG. 5 is a block diagram of another embodiment of functional circuits supporting combined packet retransmission at a transmitter.

In an alternative embodiment, FIG. 5 illustrates a configuration that forms combined packets based on combining the interleaved, coded bits of the 1 . . . N information packets. Thus, it should be understood that the transmitter 10 may form combined packets based on combining coded bits, or based on combining the logical modulation symbols derived from the coded bits. In either case, combining encoded information for combined packet formation and retransmission offers processing gain as compared to combining the information bits of the 1 . . . N packets. However, it should be understood that one or more embodiments of the transmitter 10 do combine the information bits of the 1 . . . N packets before encoding, as the basis for forming combined packets from two or more previously transmitted packets. In all cases, it will be appreciated that the transmitter 10 may include buffers or other memory elements, allowing it to retain information regarding the previously transmitted packets, such that it can generate combined packets as needed for retransmission processing.

For example, consider the case where the transmitter 10 transmits two packets A1 and A2 to the receiver 12 (or to any number of receivers 12, such as in point-to-multipoint broadcast transmissions). Assume that one or both packets fail decoding at one or more of the receivers 12, such that the transmitter 10 receives an implicit or explicit retransmission request. In response, the transmitter 10 forms a combined packet C3 from the information bits of packets A1 and A2, from the coded bits of packets A1 and A2, or from the coded modulation symbols of packets A1 and A2, according to some defined logical mapping.

Thus, where the transmitter 10 forms each combined packet by combining coded bits of the two or more previously transmitted packets to be included in the combined packet, the receiver 12 is correspondingly configured to generate soft values for each combined packet by generating soft bit values corresponding to the combined coded bits of the combined packet. With such soft bit value processing, the receiver 12 generates revised soft bit values for one or more failed packets by forming weighted combinations of the soft bit values for the coded bits of the combined packet and soft bit values previously generated for coded bits of the one or more failed packets. With that, the receiver 12 re-decodes failed packets by re-decoding the revised soft bit values for the coded bits of failed packets.

Turning back to the symbol coding context of FIG. 4, the transmitter 10 generates the combined packet C3 responsive to a retransmission request, based on combining packets A1 and A2 according to some defined logical symbol mapping. In FIG. 4, the logical modulator 24 maps the coded/interleaved bits of a packet into logical symbol indices, the combiner 26 generates the corresponding logical symbol indices of the symbols in the combined packet, and the physical modulator 28 maps the logical symbol indices of the combined packet into complex-valued symbols taken from the defined modulation alphabet (constellation). The combined packet C3 has a complex-valued symbol sequence $\{s_3[1], s_3[2], \ldots, s_3[M]\}$, given by $$s_3[k] = \gamma_{g(l,q)}^{(3)} \text{ for all } k \qquad \text{Eq. (1)}$$

for some pre-defined combiner function $g(l,q)$ that maps pairs of logical symbol indices l and q of the coded symbols $s_1[k] = \gamma_l$ and $s_2[k] = \gamma_q$ of the packets A1 and A2, respectively (belonging to symbol constellations $\Gamma_1$ and $\Gamma_2$ for packets A1 and A2, respectively), into unique indices in the set $\{1, 2, \ldots, |\Gamma_3|\}$, where $\Gamma_3 = \{\gamma_1^{(3)}, \gamma_2^{(3)}, \ldots, \gamma_{|\Gamma_3|}^{(3)}\}$ denotes the symbol constellation adopted for the combined packet C3.

Thus, where the transmitter 10 forms each combined packet by combining coded symbols of the two or more previously transmitted packets to be included in the combined packet, the receiver 12 is configured to generate soft values for each combined packet by generating soft symbol values corresponding to the combined coded symbols of the combined packet. In at least one such embodiment, the receiver 12 does this by generating revised soft symbol values for the one or more failed packets based on forming weighted combinations of the soft symbol values of the combined packet and soft symbol values previously generated for the one or more failed packets. With that processing, the receiver 12 re-decodes failed packets by re-decoding coded bits obtained from the revised soft symbol values.

More generally, the combiner function g used by the retransmission controller 14 at the transmitter 10 for forming combined packets may be configured for injective (one-to-one) mapping. For example, if $\Gamma_1$ and $\Gamma_2$ are based on the BPSK (Binary Phase Shift Keying) constellation, then $\Gamma_3$ may be based on the QPSK (Quadrature Phase Shift Keying) constellation, where the mapping function g simply maps the BPSK symbols from the packets being combined (e.g., the example packets A1 and A2) onto the real and imaginary axes, respectively, to produce QPSK symbols. In such case, two BPSK packets can be used to form a combined packet for retransmission, wherein the two BPSK packets effectively are multiplexed into a single packet via modulation constellation expansion.

In practice, the combiner function g used by the retransmission controller 14 of the transmitter 10 generally should be configured to use a many-to-one mapping. For example, consider the context of FIG. 5, where combined packets are based on combining the coded bits of two or more previously transmitted packets. Assuming that the two example packets A1 and A2 to be combined have $\Gamma_1 = \Gamma_2 = \{0,1\}$, then the combiner function g implemented by the combiner 26 can be chosen to perform XOR (modulo-2 add) of the corresponding bits of the packets A1 and A2. With that, the combined (coded) bits of the combined packet C3 are given by $$c_3(i) = c_1(i) \oplus c_2(i) \qquad \text{Eq. (2)}$$

Of course, as noted before, the transmitter 10 may form combined packets using essentially any logical mapping, and it may apply such mappings to the information bits (before encoding) of the packets to be combined, to the coded bits of those packets, or to the logical symbols formed from the coded bits of those packets. Thus, it will be understood that the configuration of the receiver 12 as regards processing of combined packets will complement the packet combining scheme implemented at the transmitter 10.

FIG. 6 illustrates functional circuit details for one or more embodiments of the receiver 12, wherein the receiver 12 includes control/processing circuits 40, including a retransmission processor 42, and RF transceiver circuits 44. As noted for the transmitter 10, the functional circuits illustrated for the receiver 12 may comprise hardware, software, or any combination thereof.

Regardless of the implementation details, FIG. 7 illustrates processing logic that may be implemented in the retransmission processor 42 of the receiver 12. While sequential processing is illustrated, those skilled in the art will appreciate that, where possible, processing steps may be performed concurrently, and that any illustrated processing may be carried out on an ongoing basis, as part of general receiver operations.

With these points in mind, the illustrated processing logic implements a method of packet decoding at the receiver 12, wherein the receiver uses retransmission requests for failed packets. In one or more embodiments, the method comprises receiving packets of encoded information bits transmitted from the transmitter 10 to the receiver 12 (Step 110), generating soft values for each packet (Step 112), decoding each packet based on its corresponding soft values (Step 114), and requesting retransmission for failed packets (Step 116), wherein failed packets are packets that fail decoding. Processing continues with receiving combined packets responsive to retransmission requests (Step 118).

Notably, each combined packet is formed at the transmitter 10 as a logical combination of two or more previously transmitted packets, including one or more failed packets. (In at least one embodiment taught herein, the transmitter 10 forms combined packets by logically combining information bits from two or more previously transmitted packets before channel encoding of those information bits. In one or more other embodiments, the transmitter 10 forms the combined packets from the encoded versions of the information bits the packets being combined.) With that basis for formulating combined packets at the transmitter 10, processing at the receiver 12 continues with generating soft values for each combined packet, and correspondingly generating revised soft values for the one or more failed packets associated with the combined packet by forming weighted combinations of the soft values of the combined packet and the soft values previously generated for the one or more failed packets (Step 120). Processing continues with re-decoding failed packets based on their corresponding revised soft values (Step 122).

Of course, the above processing steps may be repeated as needed. Indeed, the receiver 12 may request retransmission for the same failed packet again (or as many times as desired or needed), if the revised soft values generated for a given failed packet do not correctly decode. Note that in such instances, the transmitter 10 may form a subsequent combined packet using the same previously transmitted packets, but with different bit interleaving, or may add or substitute different previously transmitted packets for forming the subsequent combined packet. In general, however, each combined packet includes the one or more failed packets for which retransmission is desired.

The above processing method can be implemented in the receiver 12 through appropriate hardware and/or software configuration of the retransmission processor 42, which itself comprises one or more processing circuits, e.g., microprocessor, digital signal processor, or other digital processing element. In operation, the receiver 12 is configured to request retransmission for failed packets by explicitly or implicitly negatively acknowledging failed packets. The receiver 12 also may be configured to identify which two or more previously transmitted packets were used by the transmitter 10 to form each combined packet.

In at least one embodiment, the receiver 12 is configured to identify which two or more previously transmitted packets were used by the transmitter 10 to form each combined packet based on assuming that the transmitter 10 uses one or more default packet sequence selection schemes for formulating combined packets relative to given failed packets. For example, the receiver 12 may assume that combined packets are formed using a given failed packet and the packet sequentially transmitted immediately before the failed packet.

In another embodiment, the receiver 12 is configured to identify which two or more previously transmitted packets were used by the transmitter 10 to form each combined packet based on receiving combined packet formulation information indicating which two or more previously transmitted packets were used by the transmitter 10 to form the combined packet. That information may comprise general information applicable to all combined packets (e.g., combined packets always include the two most recently failed packets, a given failed packet and its immediately preceding packet, failed or otherwise, etc.). Conversely, the formulation information may comprise specific information applicable to given combined packets, or applicable to groups of combined packets. In at least one embodiment, the transmitter 10 sends information for each combined packet, identifying the constituent packets comprising it. Such information may be, as a non-limiting example, included in packet header information. Of course, as previously noted, any given combined packet at least includes the failed packet(s) giving rise to the retransmission request that initiated generation of that given combined packet.

Figure 8:
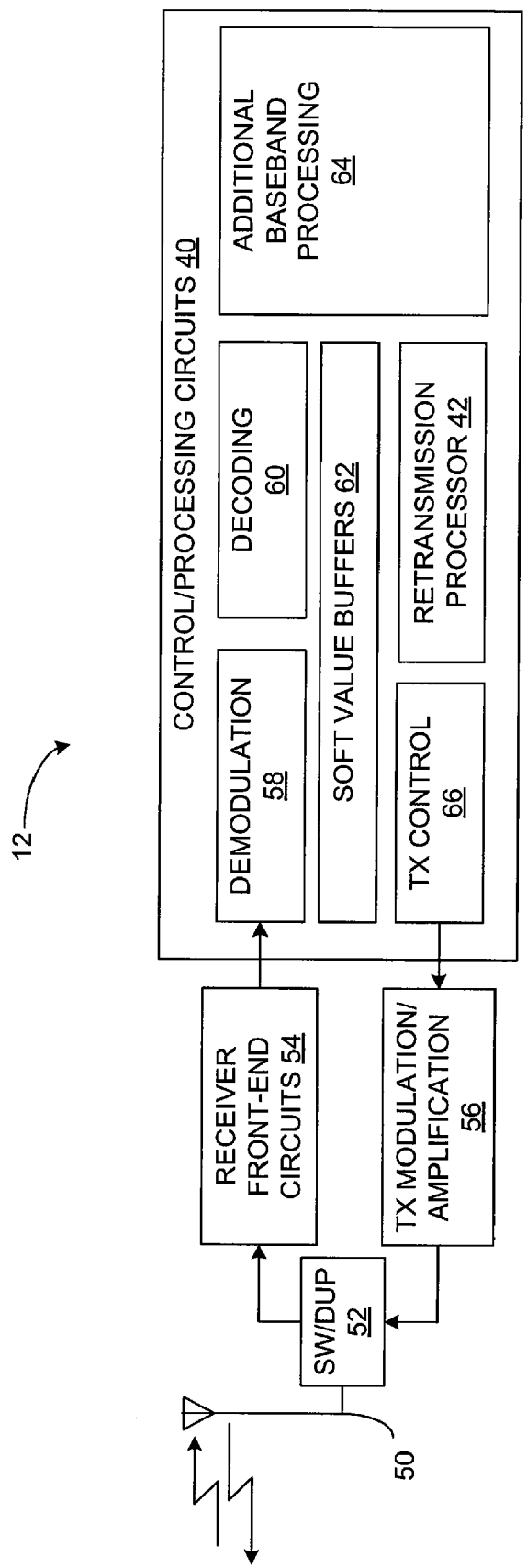
FIG. 8 is a block diagram of another embodiment of a receiver configured to support combined packet retransmission.

Turning from such details, FIG. 8 illustrates additional functional element details for one or more embodiments of the receiver 12, wherein the receiver 12 is, for example, a cellular radiotelephone or other mobile station or two-way communication device. The illustrated receiver 12 includes transmit/receive antenna(s) 50, a switch/duplexer 52, a receiver front-end 54, transmission circuits 56, a demodulator 58, a decoder 60, soft value buffers 62, additional baseband processing circuits 64, the previously mentioned retransmission processor 42 (for combined packet processing), and transmission control circuits 66. These details provide a basis for an expanded discussion of combined packet processing at the receiver 12.

First, let $B_k=\{b_k(1),b_k(2),\ldots,b_k(K)\}$ represent the (raw) information bit sequence of the packet $A_k$ to be transmitted from the transmitter 10 to the receiver 12. The information bit sequence is mapped by the transmitter 10 into a code bit sequence $C_k=\{c_k(1),c_k(2),\ldots,c_k(N_k)\}$, and this code bit sequence is mapped into a sequence of complex-valued modulation symbols belonging to a finite alphabet $\Gamma_k=\{\gamma_1, \gamma_2,\ldots,\gamma_{|\Gamma_k|}\}$ (such as BPSK, QPSK, or 16 QAM), where $|\Gamma_k|$ denotes the number of symbols in the alphabet for the k-th packet to be transmitted to the receiver 12.

The corresponding sequence of symbols (being transmitted) may be represented as $\{s_k[1], s_k[2], \ldots, s_k[M_k]\}$, where $M_k=N_k/\log 2|\Gamma_k|$. Note that for simplicity, one may assume that each packet produces the same number of symbols for transmission, i.e., $M_1=M_2=M$. Otherwise, if, for example, $M_1>M_2$, retransmission processing as taught herein still may be used by combining only part of a longer packet with a shorter packet for combined packet generation.

In any case, with the above formulation, and with the transmission of packets over a noisy communication channel to the receiver 12, the received signal at the receiver 12 for the k-th packet can be expressed as $Y_k=\{y_k[1],y_k[2],\ldots,y_k[M]\}$. Picking up with the earlier example involving given packets A1 and A2, the transmitter 10 transmits packets A1 and A2 as a sequence of modulation symbols, and the receiver 12 correspondingly demodulates $Y_1$ and $Y_2$ to produce the a posteriori probabilities $$S_k(l,n)=Pr(s_k[n]=\gamma_l|Y_k) \qquad \text{Eq. (3)}$$

for k=1, 2, $\ldots$, $|\Gamma_k|$ and n=1, 2, $\ldots$, M. The symbol probabilities for the k-th packet can be conveniently represented by a matrix of dimension $|\Gamma_k|$ by M, denoted as $S_k$. The element at the l-th row and the n-th column of $S_k$ is given by $S_k(l,n)$. Because each column of $S_k$ must sum to one (in terms of probabilities), only $|\Gamma_k|-1$ rows of $S_k$ need to be stored at the receiver 12 for each k-th packet.

Continuing, let $n_{k,i}$ denote the time index of the symbol that carries the coded bit $c_k(i)$ of the k-th packet. Also, let $m_{k,i}$ denote the bit index within that symbol that corresponds to $c_k(i)$. In other words, $s_k[n_{k,i}] \in \Gamma_k$ is the symbol that carries the information about the particular code bit $c_k(i)$ of the k-th packet. For each symbol $\gamma \in \Gamma_k$, let $X_k(\gamma,j)$ denote the j-th bit of the bit vector that corresponds to the symbol $\gamma$, for each $j=1, 2, \ldots, \log_2|\Gamma_k|$. Thus, $X_k(s_k[n_{k,j}], m_{k,i}) = c_k(i)$, for k=1 and 2, and i=1, 2, ..., $N_k$. At the receiver 12, the soft code bit value $\hat{c}_k(i) = Pr(c_k(i)=1|Y_k)$, which can be obtained from $S_k$ by computing $$\hat{c}_k(i) = \sum_{l: X_k(\gamma_l, m_{k,i})=1} S_k(l, n_{k,i}). \qquad \text{Eq. (4)}$$

Thus, in at least one embodiment, the receiver 12 is configured to decode received packets using soft values estimated for the code bits included in those packets. For example, assume that the receiver 12 receives packets A1 and A2, generates soft values for their included code bits (e.g., Eq. (4)), and then decodes both packets based on those soft values. Further assume that decoding fails for at least one information bit for each such packet, where such failures generally are detected as CRC errors.

In any case, the receiver 12 sends a negative acknowledgment (NACK) to the transmitter 10, for one or both the A1 and A2 packets. In response, the transmitter 10 generates the combined packet C3, based on combining the previously transmitted A1 and A2 packets. For example, the transmitter 10 may perform an XOR combining of the coded bits of the A1 and A2 packets. The combined packet C3 has a complex-valued symbol sequence $\{s_3[1], s_3[2], \ldots, s_3[M]\}$, given by $$s_3[k] = \gamma_{g(l,q)}^{(3)} \qquad \text{Eq. (5)}$$

for any defined combiner function $g(l,q)$ as detailed earlier herein.

Let $Y_k = \{y_3[1], y_3[2], \ldots, y_3[M]\}$ be the received signal at the receiver 12 corresponding to the combined packet C3. That signal is demodulated to produce the symbol probability matrix $S_3$, whose element at the l-th row and the n-th column is given by $$S_3(l,n) = Pr(s_3[n] = \gamma_l|\gamma_3) \qquad \text{Eq. (6)}$$

for l=1, 2, ..., $|\Gamma_k|$ and n=1, 2, ..., M.

At least one embodiment of the retransmission processor 42 functions as a multi-packet code combiner, to produce combined symbol probability matrices $\bar{S}_1$ and $\bar{S}_2$ for the packets A1 and A2, respectively. The element at the l-th row and the n-th column in such matrix is given by $$\bar{S}_k(l,n) = Pr(s_k(n) = \gamma_l|Y_1, Y_2, Y_3) \qquad \text{Eq. (7)}$$

for l=1, 2, ..., $|\Gamma_k|$ and n=1, 2, ..., M.

From the matrices $\bar{S}_1$ and $\bar{S}_2$, the combined soft bit value $c'_k(i)$, k=1,2, which represents the probability that $c_k(i)$ is 1 given all the received signals $Y_1, Y_2$, and $Y_3$. In other words, $$c'_k(i) = Pr(c_k(i)=1|Y_1, Y_2, Y_3) \qquad \text{Eq. (8)}$$

can be obtained by computing $$c'_k(i) = \sum_{l: X_k(\gamma_l, m_{k,i})=1} \bar{S}_k(l, n_{k,i}) \qquad \text{Eq. (9)}$$

Thus, the matrices $\bar{S}_1$ and $\bar{S}_2$ can be obtained from the matrices $S_1$ and $S_2$ as $$\bar{S}_k(l,n) = \alpha_k S_k(l,n) \cdot w_k(l,n) \qquad \text{Eq. (10)}$$

where $w_k(l,n)$ are relative weights given by $$w_1(l,n) \equiv \sum_{q=1}^{|\Gamma_2|} S_2(q,n) S_3(g(l,q),n) \qquad \text{Eq. (11)}$$

and $$w_2(l,n) \equiv \sum_{q=1}^{|\Gamma_1|} S_1(q,n) S_3(g(l,q),n) \qquad \text{Eq. (12)}$$

and where $\alpha_k$ are normalization constants given by $$\alpha_k = \frac{1}{\sum_{l=1}^{|\Gamma_k|} S_k(l,n) w_k(l,n)} \qquad \text{Eq. (13)}$$

Note that for BPSK modulation, the combined soft bit values $c'_k(i)$ can be expressed directly in terms of the individual soft bit values $\hat{c}_1(i), \hat{c}_2(i)$, and $\hat{c}_3(i)$ as follows:

$$c'_1(i) = \alpha_1 \hat{c}_1(i)\{\hat{c}_2(i)(1-\hat{c}_3(i)) + (1-\hat{c}_2(i))\hat{c}_3(i)\} \qquad \text{Eq. (14)}$$

and $$c'_2(i) = \alpha_2 \hat{c}_2(i)\{\hat{c}_1(i)(1-\hat{c}_3(i)) + (1-\hat{c}_1(i))\hat{c}_3(i)\} \qquad \text{Eq. (15)}$$

where $$\alpha_1 = \frac{1}{\hat{c}_1(i)\{\hat{c}_2(i)(1-\hat{c}_3(i)) + (1-\hat{c}_2(i))\hat{c}_3(i)\} + (1-\hat{c}_1(i))\{(1-\hat{c}_2(i))(1-\hat{c}_3(i)) + \hat{c}_2(i)\hat{c}_3(i)\}} \qquad \text{Eq. (16)}$$

and $$\alpha_2 = \frac{1}{\hat{c}_2(i)\{\hat{c}_1(i)(1-\hat{c}_3(i)) + (1-\hat{c}_1(i))\hat{c}_3(i)\} + (1-\hat{c}_2(i))\{(1-\hat{c}_1(i))(1-\hat{c}_3(i)) + \hat{c}_1(i)\hat{c}_3(i)\}} \qquad \text{Eq. (17)}$$

Thus, the equations immediately above relate to the determination of soft symbol values (symbol probabilities) at the receiver 12, based on the receipt of a combined packet formed at the transmitter as shown in the context of FIG. 4. That is, in one or more embodiments, the receiver 12 is configured to generate soft values for each packet by generating a symbol probability matrix for each packet and to generate soft values for each combined packet by generating a symbol probability matrix for each combined packet. With that, the receiver 12 is configured to correspondingly generate revised soft values for the one or more failed packets associated with a given combined packet by determining one or more relative weighting values for each failed packet represented in the given combined packet as a function of symbol probabilities for the combined packet and the symbol probabilities previously generated for the other packets represented in the given combined packet, and using the one or more relative weighting values to scale symbol probabilities in the symbol probability matrix previously generated for the failed packet.

More particularly, for the originally received packets A1 and A2, the receiver 12 generated soft symbol values in the form of symbol probability matrices $S_1$ and $S_2$, then, using the soft symbol values for the combined packet C3, as given by the symbol probability matrix $S_3$, the receiver 12 generated the revised soft values for the packets A1 and A2 (assuming they both failed), as the revised symbol probability matrices $\overline{S}_1$ and $\overline{S}_2$. Where the generation of the revised symbol probability matrix $\overline{S}_1$ depended on the weighted combinations of $S_2$ and $S_3$, and the revised symbol probability matrix $\overline{S}_2$ depended on the weighted combinations of $S_1$ and $S_3$. The receiver 12 thus uses the revised symbol probability matrices $\overline{S}_1$ and $\overline{S}_2$ as the basis for re-decoding the packets A1 and A2.

In much the same manner, the receiver 12 can be configured to generate initial soft bit values for the coded bits of A1 and A2 (any received packets, in general), and then use the soft bit values of a corresponding combined packet to generate revised soft bit values for re-decoding. More particularly, the receiver 12 can be configured to generate soft values for each packet by generating soft bit values for the coded bits in each packet, and to generate soft bit values for the coded (combined) bits in each combined packet. With that, for a given failed packet, the receiver 12 generates revised soft bit values for failed packets based by determining one or more relative weighting values for each failed packet represented in the given combined packet as a function of the soft bit values of the combined packet and the soft bit values previously generated for the other packets represented in the given combined packet, and using the one or more relative weighting values to scale the soft bit values previously generated for the failed packet.

In still other embodiments, the receiver 12 is configured to generate soft values for received packets and received combined packets by generating bit or symbol likelihoods for them. In such embodiments, the receiver 12 is configured to correspondingly generate revised soft values for the one or more failed packets associated with a given combined packet by determining one or more relative weighting values for each failed packet represented in the given combined packet as a function of the bit or symbol likelihoods for the combined packet and the bit or symbol likelihoods previously generated for the other packets represented in the given combined packet, and using the one or more relative weighting values to scale the bit or symbol likelihoods previously generated for the failed packet.

In such embodiments, the receiver 12 may be configured to reduce computational complexity for generating the revised soft values by operating only on most likely bit or symbol likelihoods for the combined packet and for the two or more previously transmitted packets represented in the combined packet. In such contexts, the receiver 12 may be configured to, for bit or symbol likelihoods close to 0, round such bit or symbol likelihoods to 0 in advance of determining which bit or symbol likelihoods are most likely. Also, in such embodiments, the receiver 12 may be configured to generate bit or symbol likelihoods for each packet by jointly estimating subsets of bit or symbol likelihoods for the packet, and to generate bit or symbol likelihoods for each combined packet by jointly estimating subsets of bit or symbol likelihoods for the combined packet. For more information regarding joint probability estimation, see A. Khayrallah and G. E. Bottomley, "Joint Probability in Demodulation and Decoding," Conference on Information Sciences and Systems, March 2001.

Further, as noted elsewhere herein, the combined packet retransmission teachings presented herein can be applied multiple times for additional retransmissions of combined packets. For example, the receiver 12 can first apply its soft value decoding algorithm to originally received packets A1 and A2, as first revised using the first combined packet C3. Assuming that re-decoding based on the revised soft values fails, those revised soft values are then treated by the receiver 12 as the initial soft outputs for the original packets A1 and A2, and the receiver applies its soft value decoding algorithm to the revised soft values using as second combined packet C4. Such processing can be repeated as needed or desired for repeated decoding failures of given packets.

Additionally, those skilled in the art will appreciate that the examples given herein for two packets (A1 and A2) are illustrative, and in no way limiting. That is, more than two packets can be combined by the transmitter 10 to form a combined packet for retransmission. The number of packets to be combined can be determined adaptively, for example, such as based on the channel error rate. In such an approach, more packets can be combined for retransmission if the channel error rate is low, and vice versa. To support such operation, the receiver 12 can be configured to sense channel error rate by counting the number of bit erasures in received packets.

In at least one such embodiment, the receiver 12 and/or the transmitter 10 sense or otherwise monitor the channel error rate. For channel error rates above a defined threshold, the transmitter 10 and receiver 12 do not use combined packet retransmission, but rather switch to CC-based retransmission, wherein single failed packets are retransmitted from the transmitter 10 to the receiver 12, for Chase combining at the receiver 12. Doing so can lower the channel error rate more quickly than combined packet retransmission. Once the channel error rate is at or below the threshold, the transmitter 10 and the receiver 12 revert back to combined packet retransmission, which allows finer code rate reductions on retransmission.

Further, those skilled in the art will appreciate that combined packet retransmission as taught herein can be used for any packet re-transmission methodology or framework. Such retransmission schemes include, without limitation, any hybrid ARQ scheme using combined (XOR) packets, such as the Stutter XOR schemes.

With these and other variations and extensions in mind, those skilled in the art will appreciate that the foregoing description and the accompanying drawings represent non-limiting examples of the methods and apparatus taught herein for transmit diversity coding. As such, the present invention is not limited by the foregoing description and accompanying drawings. Instead, the present invention is limited only by the following claims and their legal equivalents.

What is claimed is:

1. A method of packet decoding at a receiver utilizing retransmission requests for failed packets comprising:
   receiving packets of encoded information bits transmitted from a transmitter to the receiver;
   generating soft values for each packet;
   decoding each packet based on its corresponding soft values;
   requesting retransmission for failed packets, wherein failed packets are packets that fail decoding;
   receiving combined packets responsive to retransmission requests, each combined packet formed at the transmitter as a logical combination of two or more previously transmitted packets, including one or more failed packets;

for each combined packet received at the receiver, identifying which two or more previously transmitted packets were used by the transmitter to form the combined packet;

generating soft values for each combined packet, and correspondingly generating revised soft values for the one or more failed packets associated with the combined packet by forming weighted combinations of the soft values of the combined packet and the soft values previously generated for the one or more failed packets; and re-decoding failed packets based on their corresponding revised soft values.

2. The method of claim 1, wherein requesting retransmission for failed packets comprises explicitly or implicitly negatively acknowledging failed packets.

3. The method of claim 1, wherein identifying which two or more previously transmitted packets were used by the transmitter to form the combined packet comprises assuming that the transmitter uses one or more default packet sequence selection schemes for formulating combined packets relative to given failed packets.

4. The method of claim 1, wherein identifying which two or more previously transmitted packets were used by the transmitter to form the combined packet comprises receiving combined packet formulation information indicating which two or more previously transmitted packets were used by the transmitter to form the combined packet.

5. The method of claim 4, wherein receiving combined packet formulation information indicating which two or more previously transmitted packets were used by the transmitter to form the combined packet comprises receiving general information applicable to all combined packets or receiving specific information applicable to a given combined packet or applicable to given groups of combined packets.

6. The method of claim 1, wherein the transmitter forms each combined packet by combining coded bits of the two or more previously transmitted packets to be included in the combined packet, and wherein generating soft values for each combined packet comprises generating soft bit values corresponding to the combined coded bits of the combined packet.

7. The method of claim 6, wherein correspondingly generating revised soft values for the one or more failed packets associated with the combined packet by forming weighted combinations of the soft values of the combined packet and the soft values previously generated for the one or more failed packets comprises generating revised soft bit values for coded bits of the one or more failed packets by forming weighted combinations of the soft bit values for the coded bits of the combined packet and soft bit values previously generated for coded bits of the one or more failed packets.

8. The method of claim 7, wherein re-decoding failed packets comprises re-decoding the revised soft bit values for the coded bits of failed packets.

9. The method of claim 1, wherein the transmitter forms each combined packet by combining coded symbols of the two or more previously transmitted packets to be included in the combined packet, and wherein generating soft values for each combined packet comprises generating soft symbol values corresponding to the combined coded symbols of the combined packet.

10. The method of claim 9, wherein correspondingly generating revised soft values for the one or more failed packets associated with the combined packet by forming weighted combinations of the soft values of the combined packet and the soft values previously generated for the one or more failed packets comprises generating revised soft symbol values for the one or more failed packets by forming weighted combinations of the soft symbol values of the combined packet and soft symbol values previously generated for the one or more failed packets.

11. The method of claim 10, wherein re-decoding failed packets comprises re-decoding coded bits obtained from the revised soft symbol values.

12. The method of claim 1, wherein generating soft values for each packet comprises generating a symbol probability matrix for each packet, wherein generating soft values for each combined packet comprises generating a symbol probability matrix for each combined packet, and wherein correspondingly generating revised soft values for the one or more failed packets associated with a given combined packet comprises determining one or more relative weighting values for each failed packet represented in the given combined packet as a function of symbol probabilities for the combined packet and the symbol probabilities previously generated for the other packets represented in the given combined packet, and using the one or more relative weighting values to scale symbol probabilities in the symbol probability matrix previously generated for the failed packet.

13. The method of claim 1, wherein generating soft values for each packet comprises generating bit or symbol likelihoods for each packet, wherein generating soft values for each combined packet comprises generating bit or symbol likelihoods for each combined packet, and wherein correspondingly generating revised soft values for the one or more failed packets associated with a given combined packet comprises determining one or more relative weighting values for each failed packet represented in the given combined packet as a function of the bit or symbol likelihoods for the combined packet and the bit or symbol likelihoods previously generated for the other packets represented in the given combined packet, and using the one or more relative weighting values to scale the bit or symbol likelihoods previously generated for the failed packet.

14. The method of claim 13, further comprising reducing computational complexity for generating the revised soft values by operating only on most likely bit or symbol likelihoods for the combined packet and for the two or more previously transmitted packets represented in the combined packet.

15. The method of claim 14, further comprising, for bit or symbol likelihoods close to 0, rounding such bit or symbol likelihoods to 0 in advance of determining which bit or symbol likelihoods are most likely.

16. The method of claim 13, wherein generating bit or symbol likelihoods for each packet comprises jointly estimating subsets of bit or symbol likelihoods for the packet, and wherein generating bit or symbol likelihoods for each combined packet comprises jointly estimating subsets of bit or symbol likelihoods for the combined packet.

17. The method of claim 13, wherein the transmitter forms each combined packet by logically combining information bits from two or more previously transmitted packets before channel encoding of the information bits.

18. A receiver utilizing retransmission requests for failed packets, said receiver comprising one or more processing circuits configured to:

receive packets of encoded information bits transmitted from a transmitter to the receiver;

generate soft values for each packet;

decode each packet based on its corresponding soft values;

request retransmission for failed packets, wherein failed packets are packets that fail decoding;

receive combined packets responsive to retransmission requests, each combined packet formed at the transmitter as a logical combination of two or more previously transmitted packets, including one or more failed packets;

identify which two or more previously transmitted packets were used by the transmitter to form each combined packet;

generate soft values for each combined packet, and correspondingly generate revised soft values for the one or more failed packets associated with the combined packet by forming weighted combinations of the soft values of the combined packet and the soft values previously generated for the one or more failed packets; and re-decode failed packets based on their corresponding revised soft values.

19. The receiver of claim 18, wherein the receiver is configured to request retransmission for failed packets by explicitly or implicitly negatively acknowledging failed packets.

20. The receiver of claim 18, wherein the receiver is configured to identify which two or more previously transmitted packets were used by the transmitter to form each combined packet based on assuming that the transmitter uses one or more default packet sequence selection schemes for formulating combined packets relative to given failed packets.

21. The receiver of claim 18, wherein the receiver is configured to identify which two or more previously transmitted packets were used by the transmitter to form each combined packet based on receiving combined packet formulation information indicating which two or more previously transmitted packets were used by the transmitter to form the combined packet.

22. The receiver of claim 21, wherein the receiver is configured to receive combined packet formulation information indicating which two or more previously transmitted packets were used by the transmitter to form the combined packet as general information applicable to all combined packets or as specific information applicable to a given combined packet or applicable to given groups of combined packets.

23. The receiver of claim 18, wherein the transmitter forms each combined packet by combining coded bits of the two or more previously transmitted packets to be included in the combined packet, and wherein the receiver is configured to generate soft values for each combined packet by generating soft bit values corresponding to the combined coded bits of the combined packet.

24. The receiver of claim 23, wherein the receiver is configured to correspondingly generate revised soft values for the one or more failed packets associated with the combined packet by forming weighted combinations of the soft values of the combined packet and the soft values previously generated for the one or more failed packets based on generating revised soft bit values for coded bits of the one or more failed packets by forming weighted combinations of the soft bit values for the coded bits of the combined packet and soft bit values previously generated for coded bits of the one or more failed packets.

25. The receiver of claim 24, wherein the receiver is configured to re-decode failed packets by re-decoding the revised soft bit values for the coded bits of failed packets.

26. The receiver of claim 18, wherein the transmitter forms each combined packet by combining coded symbols of the two or more previously transmitted packets to be included in the combined packet, and wherein the receiver is configured to generate soft values for each combined packet by generating soft symbol values corresponding to the combined coded symbols of the combined packet.

27. The receiver of claim 26, wherein the receiver is configured to correspondingly generate revised soft values for the one or more failed packets associated with the combined packet by forming weighted combinations of the soft values of the combined packet and the soft values previously generated for the one or more failed packets by generating revised soft symbol values for the one or more failed packets based on forming weighted combinations of the soft symbol values of the combined packet and soft symbol values previously generated for the one or more failed packets.

28. The receiver of claim 27, wherein the receiver is configured to re-decode failed packets by re-decoding coded bits obtained from the revised soft symbol values.

29. The receiver of claim 18, wherein the receiver is configured to generate soft values for each packet by generating a symbol probability matrix for each packet and to generate soft values for each combined packet by generating a symbol probability matrix for each combined packet, and wherein the receiver is configured to correspondingly generate revised soft values for the one or more failed packets associated with a given combined packet by determining one or more relative weighting values for each failed packet represented in the given combined packet as a function of symbol probabilities for the combined packet and the symbol probabilities previously generated for the other packets represented in the given combined packet, and using the one or more relative weighting values to scale symbol probabilities in the symbol probability matrix previously generated for the failed packet.

30. The receiver of claim 18, wherein the receiver is configured to generate soft values for each packet by generating bit or symbol likelihoods for each packet and to generate soft values for each combined packet by generating bit or symbol likelihoods for each combined packet, and wherein the receiver is configured to correspondingly generate revised soft values for the one or more failed packets associated with a given combined packet by determining one or more relative weighting values for each failed packet represented in the given combined packet as a function of the bit or symbol likelihoods for the combined packet and the bit or symbol likelihoods previously generated for the other packets represented in the given combined packet, and using the one or more relative weighting values to scale the bit or symbol likelihoods previously generated for the failed packet.

31. The receiver of claim 30, wherein the receiver is configured to reduce computational complexity for generating the revised soft values by operating only on most likely bit or symbol likelihoods for the combined packet and for the two or more previously transmitted packets represented in the combined packet.

32. The receiver of claim 31, wherein the receiver is configured to, for bit or symbol likelihoods close to 0, round such bit or symbol likelihoods to 0 in advance of determining which bit or symbol likelihoods are most likely.

33. The receiver of claim 30, wherein the receiver is configured to generate bit or symbol likelihoods for each packet by jointly estimating subsets of bit or symbol likelihoods for the packet, and to generate bit or symbol likelihoods for each combined packet by jointly estimating subsets of bit or symbol likelihoods for the combined packet.

34. The receiver of claim 18, wherein the transmitter is configured to form each combined packet by logically combining information bits from two or more previously transmitted packets before channel encoding of the information bits.

35. A method of retransmitting packets of encoded information bits from a transmitter comprising:

receiving a retransmission request for one or more failed packets, wherein failed packets are those packets that fail decoding at an associated receiver;

forming a combined packet responsive to the retransmission request, wherein forming the combined packet comprises combining coded bits or coded symbols of the two or more previously transmitted packets, and wherein the combined packet is a logical combination of coded bits or symbols for two or more previously transmitted packets, including the one or more failed packets;

transmitting the combined packet to the associated receiver; and transmitting information indicating which two or more previously transmitted packets were used to form a given combined packet.

36. The method of claim 35, further comprising changing a bit interleaving used to form subsequent combined packets sent for repeated decoding failures of a same failed packet.

37. The method of claim 35, wherein transmitting information indicating which two or more previously transmitted packets were used to form a given combined packet comprises one of transmitting general information applicable to all combined packets or transmitting specific information applicable to given combined packets or to given subsets of combined packets.

38. A transmitter configured to retransmit packets of encoded information bits to an associated receiver, the transmitter comprising one or more processors configured to:

receive a retransmission request for one or more failed packets, wherein failed packets are those packets that fail decoding at the associated receiver;

form a combined packet responsive to the retransmission request, wherein the transmitter is configured to form the combined packet by combining coded bits or coded symbols of the two or more previously transmitted packets, and wherein the combined packet is a logical combination of coded bits or symbols for two or more previously transmitted packets, including the one or more failed packets;

transmit the combined packet to the associated receiver; and transmit information indicating which two or more previously transmitted packets were used to form a given combined packet.

39. The transmitter of claim 38, wherein the transmitter is configured to change a bit interleaving used to form subsequent combined packets sent for repeated decoding failures of a same failed packet.

40. The transmitter of claim 38, wherein the transmitter is configured to transmit information indicating which two or more previously transmitted packets were used to form a given combined packet by one of transmitting general information applicable to all combined packets or transmitting specific information applicable to given combined packets or to given subsets of combined packets.

* * * * *